UNITED STATES PATENT OFFICE.

PAUL EHRLICH AND LOUIS BENDA, OF FRANKFORT-ON-THE-MAIN, GERMANY, ASSIGNORS TO CASSELLA COLOR COMPANY, OF NEW YORK, N. Y.

3.6-DIAMINOACRIDINIUM AND ITS SALTS.

1,005,176.     Specification of Letters Patent.     Patented Oct. 10, 1911.

No Drawing.     Application filed March 3, 1911. Serial No. 612,083.

*To all whom it may concern:*

Be it known that we, PAUL EHRLICH, M. D., professor of medicine, a citizen of the Empire of Germany, and LOUIS BENDA, Ph. D., chemist, a citizen of the Swiss Republic, both residing in Frankfort-on-the-Main, in the Province of Hesse-Nassau and Kingdom of Prussia, Germany, have invented certain new and useful Improvements in the Manufacture of 3.6-Diaminoacridinium and Its Salts, of which the following is a full description.

We have discovered that the hitherto unknown 3.6 diaminoalkylacridinium and its salts

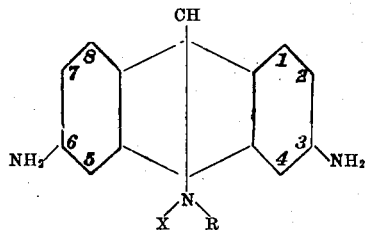

R representing an alkyl such as $CH_3$, $C_2H_5$, $C_6H_5CH_2$, etc., and X a negative substituent such as Cl, $SO_4H$, $NO_3$, $CH_3$, COO, etc., may be obtained by alkylating 3.6 diaminoacridin. In order to introduce the alkyl group into the right position, the amino groups may be first acylated and saponified after the alkylation.

The new compounds are valuable dyestuffs but have also proved excellent specifics against the sleeping sickness and other infectious diseases caused by trypanosomes and similar parasites.

A technical process of producing the 3.6 diaminoacridin has not been described until now. It had only been prepared by Schoepff (BB. XXVII, 2320, 1894) who reduced the difficultly obtainable diaminoacridone with sodium amalgam in an alcoholic solution. Schoepff also mentions that Gram obtained diaminoacridin by heating tetraaminodiphenylmethane with hydrochloric acid to 170° C. in a closed tube. When following Gram's method however, a black amorphous mass is obtained as raw material, from which the desired end product can only be obtained by a complicated process of purification with a very poor yield. As moreover the tetraaminodiphenylmethane is a body which can only be isolated with difficulty, Gram's method must be deemed technically useless.

We have now discovered that an excellent yield of pure diaminoacridin is obtained if a solution of tetraaminodiphenylmethane in mineral acids is heated in the presence of tin salts to about 135° C. This invention is very valuable in practice since the solution obtained on reduction of the $o$-$o^1$-dinitro-$p$-$p^1$-diaminodiphenylmethane by means of tin or a stannous salt and acid can be used directly. The peculiar action of the tin moreover makes it even unnecessary to start from a pure nitro body. Compared with its higher homologues, such as acridin yellow, the diaminoacridin shows the advantage of a much better solubility.

The process of producing the new compounds is illustrated by the following example:

Example: 25 kilos $p$-$p^1$-diaminodiphenylmethane are introduced into 500 kilos sulfuric acid of 66° Bé.; the solution is cooled off to 0° C., and 54 kilos nitrating acid (16.5 kilos $HNO_3$) are gradually introduced while stirring thoroughly, care being taken that the temperature does not rise above 5° C. The whole is then allowed to stand for two or three hours at 8 to 10° C., then poured on to ice, neutralized with soda or caustic soda lye, and finally made strongly alkaline by addition of $NH_3$, sucked off, washed, and pressed. The paste, weighing about 90 kilos, may be directly reduced. It is mixed with 24 kilos hydrochloric acid of specific gravity 1.18 and heated to 50° C. Then 45 kilos granulated tin are introduced. The temperature rises to about 110° C., and after a little while the reduction is complete. The clear solution so obtained is then heated during four hours in an autoclave to about 135° C. On cooling, the diaminoacridin separates completely in the form of the tin double salt as shining brownish crystals. In order to produce the base free from tin, the double salt is filtered off and dissolved in 50 liters boiling water, neutralized with caustic soda lye, and made alkaline with sodium carbonate. The diaminoacridin is extracted with boiling water from the filtered off precipitate; on cooling the filtrate, it separates in the form of shining leaflets of an orange to brown color. Its hydrochlorid is very easily soluble in cold water. Cotton treated with tannic acid, and leather are dyed pure yellow shades. 5 kilos diaminoacridin, 13 kilos acetic acid anhydrid and 1.25 kilos anhydrous sodium acetate are heated to boiling until a sample, when treated with hydrochloric acid and sodium nitrite, no longer turns purple. It is then diluted with 35 liters water, boiled, filtered, and allowed to crystallize. After a prolonged standing, the liquid is removed by filtrating, the residue dissolved in hot water and saturated to excess with about 8 liters ammonia. The 3.6 bis-acetaminoacridin then separates. It is filtered, washed, pressed, and dried. 4 kilos of this compound are introduced at 180° C. into 40 kilos nitrobenzol while stirring well; the temperature is then kept at about 175° C., adding 3.3 kilos p-toluolsulfonic acid methyl ester under constant stirring. The reaction sets in immediately. It is then allowed to cool, and after about 15 hours, the crystals which have separated are filtered off. 5.45 kilos of these crystals, 17.50 kilos water and 17.50 liters concentrated hydrochloric acid are heated for several hours to about 110° C. On cooling, the saponified compound separates in the form of red needles. These are separated from the mother-lye and dried.

The 3.6 diamino-10-methylacridinium chlorid is very easily soluble in cold water with a yellow color showing a green fluorescence, especially in diluted solutions. The solutions in methyl- and ethyl-alcohol show a beautiful green fluorescence. The solution in concentrated sulfuric acid is almost colorless but shows a very intense green fluorescence. Cotton treated with tannic acid is dyed yellow to orange shades fast to soda and soaping. The corresponding ethyl-, propyl-, benzyl- and other compounds behave in a manner similar to the methyl derivative described.

The new compounds represent excellent specifics against the sleeping sickness and other infectious diseases caused by trypanosomes and similar parasites. They surpass in that respect all other coloring matters hitherto examined. They are for instance three times more effective than the known acridin yellow.

Having now particularly described and ascertained the nature of our said invention, and in what manner the same is to be performed, we declare that what we claim is:—

1. The process of producing 3.6 diamino-10-alkylacridinium compounds and their salts by treating the 3.6 bis-acidyl diaminoacridin with alkylating agents and saponifying the products thus obtained substantially as described.

2. As new products the salts of the 3.6 diamino-10-alkylacridinium compounds, the constitution of which corresponds to the formula

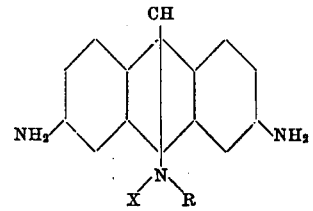

in which formula R means an alkyl radical, and X means a negative substituent, being orange to red crystalline powder, soluble in water with a yellow to orange color and a slight green fluorescence, easily soluble in methyl- and ethyl-alcohol with a very intense beautiful green fluorescence, the solution of which in diluted hydrochloric acid turns purple by the addition of sodium nitrite, and which dyes cotton treated with tannic acids yellow shades fast to soda and soaping, substantially as described.

3. As a new product the 3.6.diamino-10-methyl-acridinium-chlorid, the constitution of which corresponds to the formula

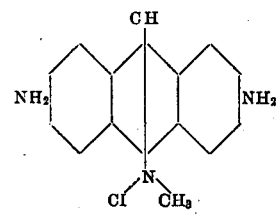

being a brownish-red crystalline powder, very easily soluble in cold water with an orange color and a slight green fluorescence, easily soluble in methyl- and ethyl-alcohol with a very intense beautiful green fluorescence, the solution of which in hydrochloric acid turns purple by the addition of sodium nitrite, and which dyes cotton treated with tannic acid yellow shades fast to soda and soaping, substantially as described.

In witness whereof we have hereunto signed our names this 17th day of February 1911, in the presence of two subscribing witnesses.

PAUL EHRLICH.
LOUIS BENDA.

Witnesses:
 JEAN GRUND,
 CARL GRUND.